United States Patent [19]

Schultz et al.

[11] Patent Number: 4,904,294
[45] Date of Patent: Feb. 27, 1990

[54] BELT ASSISTED PRESS BENDING

[75] Inventors: Stephen J. Schultz, Pittsburgh; Terry L. Wolfe, Allison Park, both of Pa.; Richard E. Wilhelm, Galion, Ohio

[73] Assignee: PPG Industries, INc., Pittsburgh, Pa.

[21] Appl. No.: 288,348

[22] Filed: Dec. 22, 1988

[51] Int. Cl.⁴ ............................................. C03B 23/03
[52] U.S. Cl. ....................................... 65/106; 65/107; 65/273; 65/290
[58] Field of Search ................. 65/106, 107, 273, 290

[56] References Cited

U.S. PATENT DOCUMENTS

| | | | |
|---|---|---|---|
| 2,223,124 | 11/1940 | Owen | 65/273 X |
| 3,459,521 | 8/1969 | Nedelec | 65/106 X |
| 3,806,330 | 4/1974 | Martin . | |
| 4,318,728 | 3/1982 | Claassen | 65/106 |
| 4,483,703 | 11/1984 | Kellar et al. | 65/273 |
| 4,526,605 | 7/1985 | Frank et al. | 65/273 |
| 4,579,577 | 4/1986 | Claassen | 65/273 |
| 4,662,925 | 5/1987 | Thimons et al. | 65/104 |
| 4,666,492 | 5/1987 | Thimons et al. | 65/29 |
| 4,666,493 | 5/1987 | Frank et al. | 65/29 |
| 4,666,496 | 5/1987 | Fecik et al. | 65/273 |
| 4,743,285 | 5/1988 | McKelvey | 65/107 |
| 4,767,437 | 8/1988 | Lampman et al. | 65/104 |

Primary Examiner—Arthur Kellogg
Attorney, Agent, or Firm—Andrew C. Siminerio

[57] ABSTRACT

A heat softened glass sheet is conveyed directly from a heating furnace onto an advancing conveyor belt which is supported on a scissor table. The glass sheet is advanced on the belt to a position below an upper press face. The scissor table increases the sag of the belt and the corresponding curved configuration of the supported glass sheet as it lifts the glass sheet into pressing engagement with the upper press face. During pressing, the glass sheet and belt generally conform to the shaping surface of the press face.

22 Claims, 5 Drawing Sheets

BELT ASSISTED PRESS BENDING

BACKGROUND OF THE INVENTION

1. Field of the Invention

This invention relates to the shaping of heat-softened glass sheets and, in particular, to shaping glass sheets between a full surface press face and a sheet supporting conveyor belt.

2A. Technical Consideration

Shaped glass sheets are widely used as windows in vehicles such as automobiles and the like. To be suitable for such applications, flat glass sheets must be shaped to precisely defined curvatures dictated by the shape and outline of the window frame. It is important that these windows meet stringent optical requirements and that the windows be free of optical defects that would tend to interfere with clear viewing therethrough in the viewing area.

One commercial method of shaping a glass sheet is to convey the glass sheet through a tunnel type heating furnace to heat the glass sheet to its heat softening temperature and pressing the glass sheet between a pair of contoured shaping molds. Another commercial operation which is used, in particular to simultaneously shape overlying glass sheets or doublets for glass windshields, supports the flat doublets on the contoured shaping rails of a bending iron as they are conveyed through a heating lehr. As the temperature of the glass sheets increases and approaches the heat softening temperature, the glass begins to sag under the force of gravity and the glass sheets' peripheral edge conforms to the contours of the rails. In order to properly shape the central portion of the glass doublet by gravity sag bending, the temperature of the glass sheets must be precisely controlled.

2B. Patents of Interest

U.S. Pat. No. 3,806,330 to Martin teaches a vertical press bending operation wherein a glass sheet is suspended within a refractory fabric sack supported along its upper edge while heating the glass to a desired softening temperature. After heating, the sheet and sack are transported to a position between opposing press faces which sandwich the heat softened glass sheet and sack therebetween to shape the glass to the desired configuration.

U.S. Pat. No. 4,318,728 to Claassen teaches the shaping of a glass sheet between pressing molds of complementary curvature while the glass sheet is continuously moved by a belt from a furnace exit to a cooling area. The movement of the molds is synchronized with the continuously moving glass sheet to simultaneously move toward and then away from each other and sandwich the glass sheet and belt therebetween in such a manner that the molds' relative orientation is not changed during glass sheet engagement.

U.S. Pat. Nos. 4,662,925 and 4,666,492 to Thimons et al, 4,666,493 to Frank et al., and 4,666,496 to Fecik et al. teach a glass sheet shaping operation wherein heat softened glass sheets are deposited on the belt of an alignment device prior to shaping. The alignment device reorients the glass to the proper position between a pair of vertically aligned press faces which thereafter sandwich the glass sheet therebetween while supported on the alignment device belt.

U.S. Pat. No. 4,743,285 to McKelvey teaches a glass sheet bending apparatus in which heat softened glass sheets are shaped while being transported on a moving conveyor made up of a plurality of individual parallel belts. The contour of the conveyor varies from being generally flat, adjacent the apparatus inlet to being significantly curved adjacent the apparatus outlet. The softened glass sheet sags under its own weight to conform to the varying conveyor contour.

SUMMARY OF THE INVENTION

The present invention provides a press bending arrangement wherein a heat softened glass is shaped between a rigid full surface press face and a conformable sheet support member. In a preferred embodiment of this invention, the glass sheet is transferred from a heating furnace directly onto an advancing conveyor belt and positioned below an upper full surface press face. The belt is supported by opposing scissor arrangements positioned along each longitudinal side of the belt which, in turn, are mounted on a vertically movable scissor table. The scissoring action of the scissor arrangements increases and decreases the curvature of the supported belt. The glass sags to a preliminary curved configuration defined by the sagged configuration of the belt as the belt supports and conveys the glass sheet. When the glass sheet is properly positioned below the upper press face, the glass and belt are moved relative to the press face to sandwich the glass between the belt and the press face. The scissoring action of the scissor assemblies urges the belt and glass sheet toward and against the press face to increase the curvature of the belt and supported glass and conform the glass sheet to the press face shaping surface. The belt is removed while the glass sheet is held against the upper press face by vacuum. After the glass sheet is shaped, a ring member is then positioned below the press face to receive the shaped glass sheet and advance it to another station for subsequent processing, such as tempering.

DETAILED DESCRIPTION OF THE INVENTION

The invention is presented with respect to the shaping of heat-softened glass sheets but it should be understood that the present invention may be used in any press bending operation for shaping heat softenable sheet material.

Figure 1:
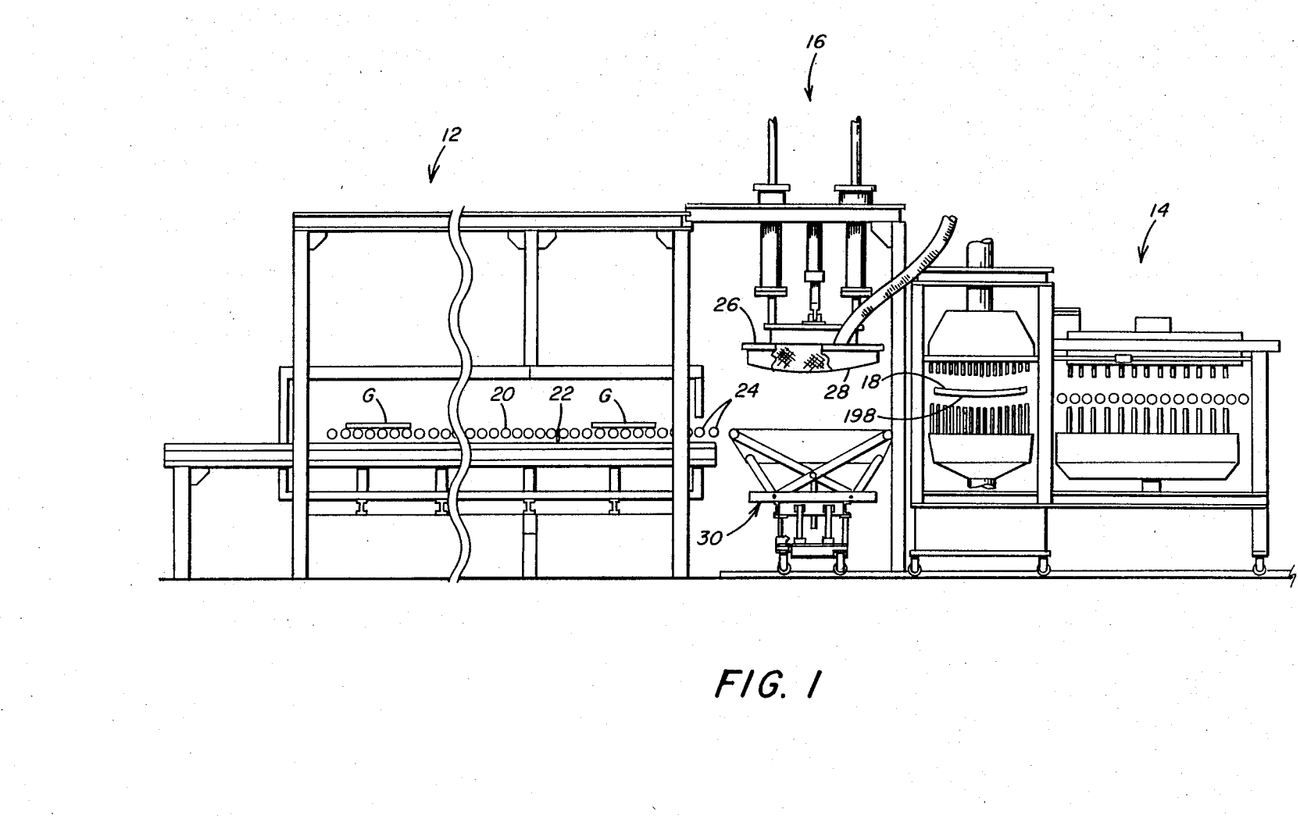
FIG. 1 is a perspective view of a press bending arrangement with a pressing station incorporated in the present invention.

Referring to FIG. 1, an apparatus for heating and shaping sheets of heat-softenable material such as glass includes a furnace 12 through glass sheets are conveyed from a loading station (not shown) while being heated to a heat deformable temperature. The cooling station 14 for cooling the curved glass sheets and an unloading station (not shown) beyond the cooling station 14 are located to the right of the furnace 12. A shaping station 16, which is the subject of the present invention, is disposed between the furnace 12 and cooling station 14. A sheet transfer means 18 located in the cooling station 14 transfers the shaped glass sheet downstream into the cooling station 14 for cooling to impart at least a partial temper and for transfer to the unloading station.

The furnace 12 includes a horizontal conveyor comprised of longitudinally spaced transversely extending conveyor rolls 20 that generally defines a path of travel that extends through the furnace 12 and into the shaping station 16. The rolls 20 of the conveyor are arranged in sections and the speed of each conveyor section may be controlled and synchronized in any convenient manner. A glass-sensing mechanism 22 determines the location of a glass sheet G by, for example, an optical or electrical glass-sensing device. The sensing mechanism 22 initiates operation of a programmable controller (not shown) which controls the sequence of the pressing operation as will be discussed later.

Immediately beyond the exit end of the furnace 12 are a plurality of transfer rolls 24 which bridge the gap between the exit end of the furnace 12 and the shaping station 16. The transfer rolls 24 are located in such a position as to define a continuation of the path of travel defined by furnace conveyor rolls 20.

With continued reference to FIG. 1, station 16 includes an upper vacuum mold 26 having shaping surface 28 and a lower belt conveying and pressing assembly 30, the latter being the subject of this invention. The upper mold 26 may be of any convenient configuration such as a steel-faced adjustable vacuum press mold as taught in U.S. Pat. No. 4,579,577 to Claassen or U.S. Pat. No. 4,483,703 to Kellar et al. or a non-adjustable, ceramic press mold as taught in U.S. Pat. No. 4,526,605 to Frank et al., which patents are hereby incorporated by reference.

Figure 2:
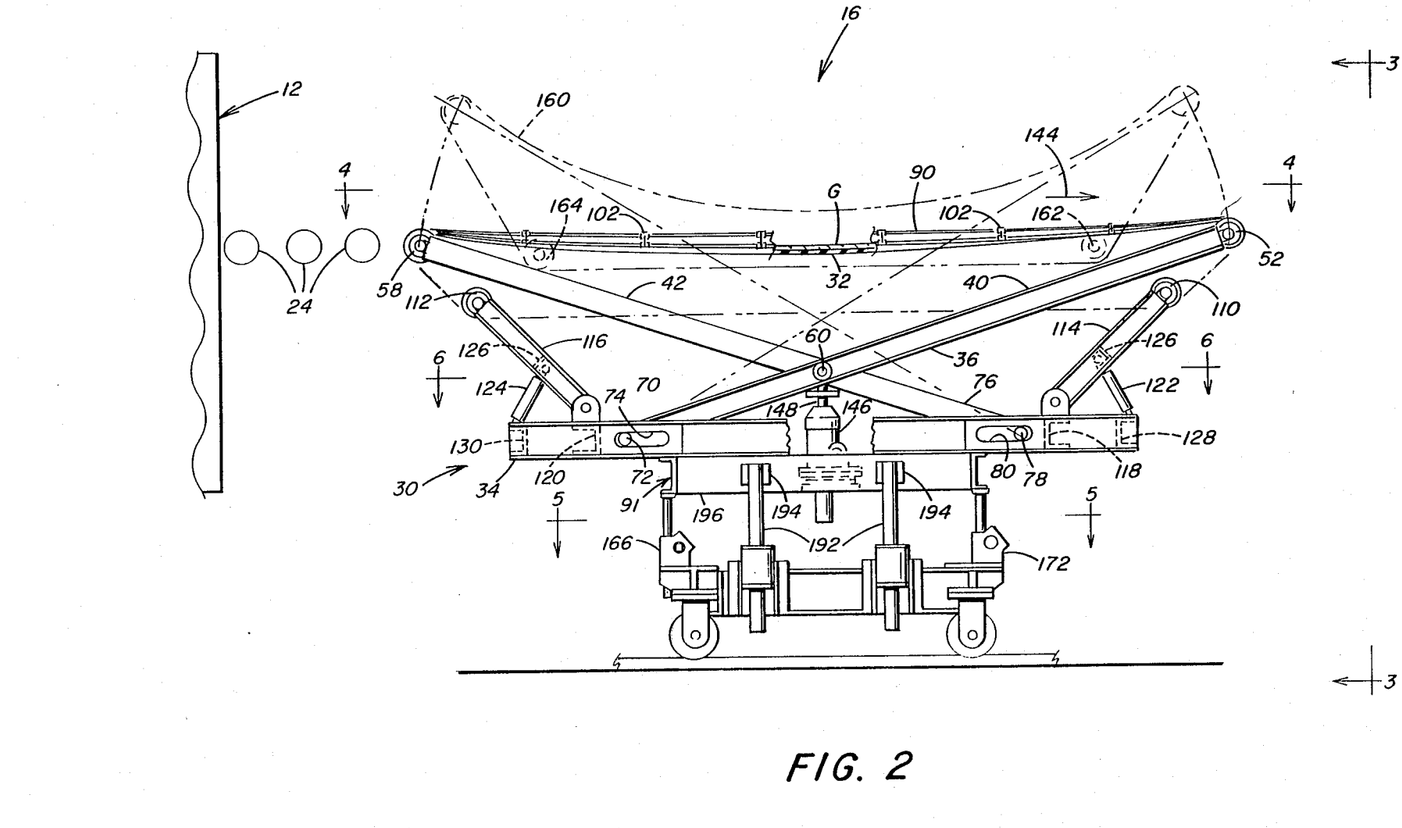
FIG. 2 is a side view of the lower press illustrated in FIG. 1 with portions removed for clarity.
Figures 3, 8:
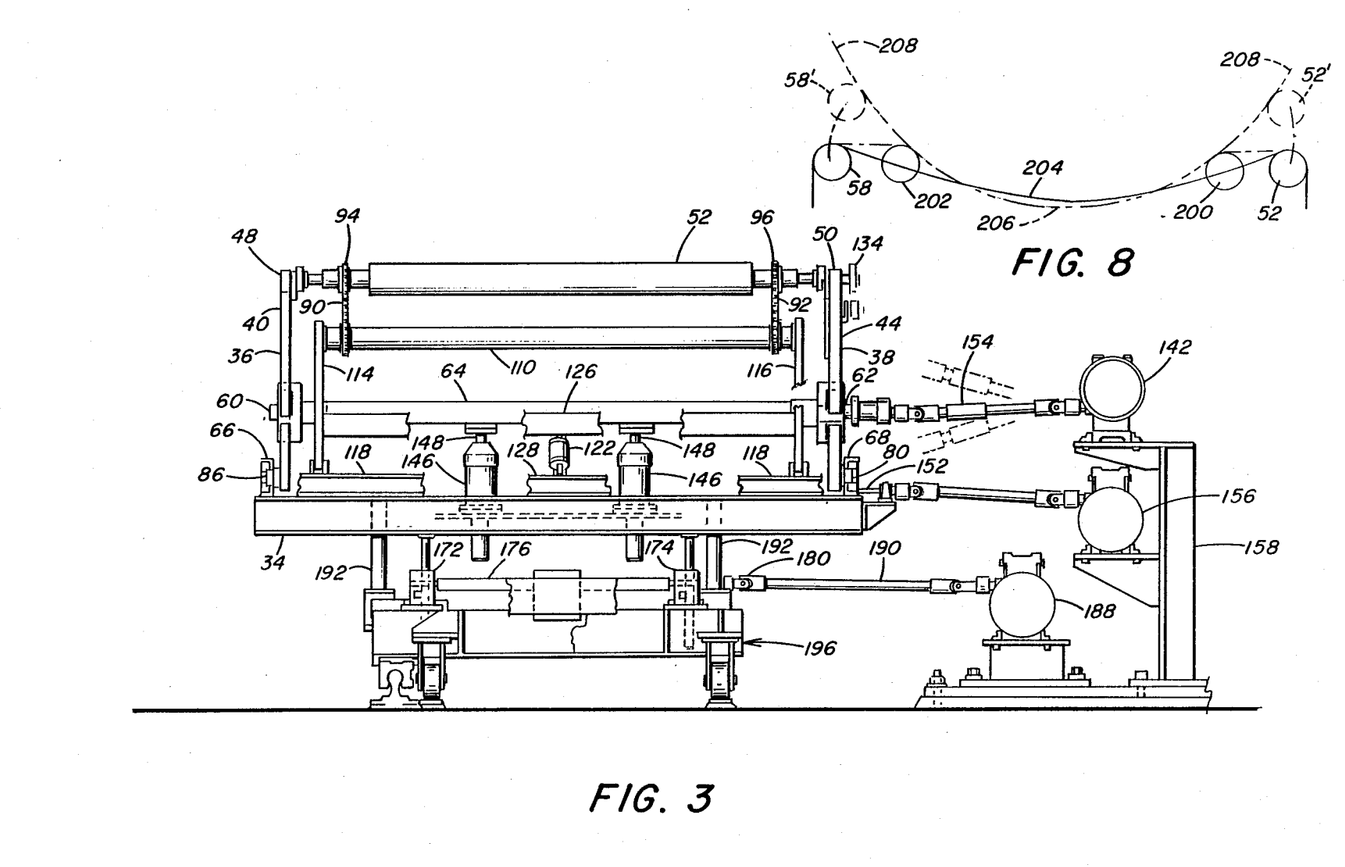
FIG. 3 is an end view of the lower press looking upstream, back toward the furnace.
FIG. 8 is a schematic of an alternate embodiment of the invention.
Figure 4:
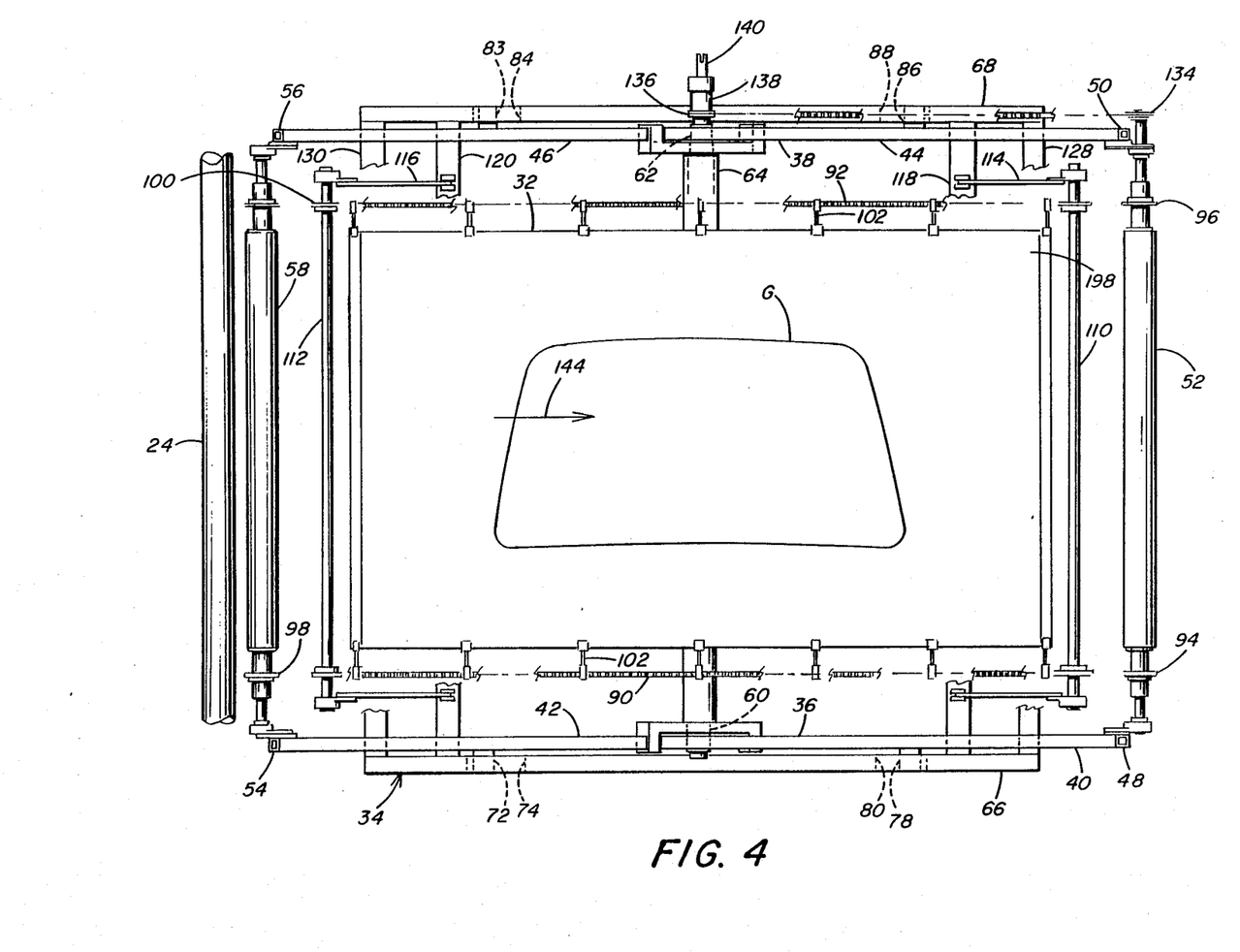
FIG. 4 is a view of the lower press taken along line 4—4 of FIG. 2 showing the flexible belt support.

Referring to FIGS. 2-4, the lower press 30 includes a conveyor belt 32 (shown only in FIGS. 2 and 4) supported on a vertically movable scissor table 34. The belt 32 is made of a heat resistant, flexible material, such but not limited to a woven fiberglass cloth impregnated with vermiculite and is capable of conforming to the curved configuration of the upper mold 26 when pressed thereagainst, as will be discussed later. Scissoring arrangements 36 and 38 which include scissor arms 40 and 42 and scissor arms 44 and 46, respectively, are positioned on opposing sides of lower assembly 30. Referring to FIG. 4, drive roll 52 extends between upper ends 48 and 50 of scissor arms 40 and 44, respectively, and trailing roll 58 extends between upper ends 54 and 56 of scissor arms 42 and 46, respectively. The scissor arms of each at scissor assembly 36 and 38 are interconnected by pin member 60 and 62, respectively, which, in turn, are joined by cross beam 64. Scissor table 34 includes slotted beams 66 and 68 to receive the lower ends of the scissor assemblies 36 and 38, respectively. Specifically, end 70 of scissor arm 40 includes pin 72 which is received within slot 74 of beam 66 and lower end 76 of scissor arm 42 includes pin 78 which is received with slot 80 of beam 66. The arrangement for scissor assembly 38 is similar with pin 82 at the lower end of scissor arm 44 being received within slot 84 of beam 68 and pin 86 at the lower end of scissor arm 46 being received within 88 of beam 68.

Figures 5, 6:
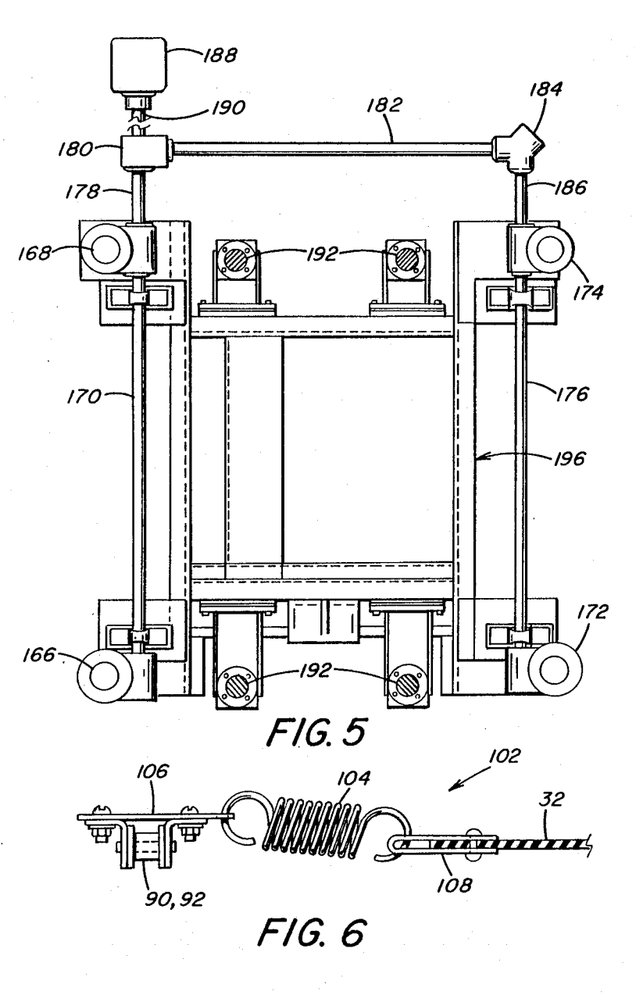
FIG. 5 is a view through line 5—5 of FIG. 2 showing the table lift arrangement, with portions removed for clarity.
FIG. 6 is a view through line 6—6 of FIG. 2 showing the scissoring drive arrangement, with portions removed for clarity.

Referring to FIGS. 2 and 4, conveyor belt 32 is supported on the scissor table 34 from rolls 52 and 58 by chains 90 and 92 which extend around sprockets 94 and 96 on drive roll 52 and sprockets 98 and 100 on trailing roll 58, respectively. The belt 32 is secured to chains 90 and 92 by mounting assemblies 102. Although not limiting in the present invention, in the particular embodiment illustrated in FIG. 5, assemblies 102 include a spring 104, connected at one end to a spring clip 106, secured to one of the chains 90, 92, and at the other end to a grommet 108 through the belt 32. The ability of the springs 104 to elongate allows the belt 32 to more easily conform to the shape of the upper mold 26 during the glass sheet shaping operation, as will be discussed later.

The preferred embodiment of the invention also includes take-up rolls 110 and 112 which are supported on frame members 114 and 116, respectively, on the scissor table 34 which in turn are pivotally mounted on beams 118 and 120, respectively, as shown in FIGS. 2, 3, and 4. Pistons 122 and 124 which are secured on one end to cross beam 126 (shown only in FIG. 3) of each frame 114 and 116 and at the opposite end to frame mounting beams 128 and 130 respectively, pivot the frames 114 and 116 and translate the associated take-up rolls 110 and 112 respectively, to control the tension in the support chains 90 and 92 and the length of these chains between rolls 52 and 58. Referring to FIGS. 3 and 4, belt drive arrangement is positioned along side of scissor assembly 38 to drive roll 52 and move the belt 32. Specifically, a drive chain 132 interconnects sprocket 134 on drive roll 52 and sprocket 136 of coupling 138 which links drive shaft 140 with drive 142 (shown in FIG. 3 only). Drive 142 rotates drive roll 52 in a clockwise direction as shown in FIG. 2 to move belt 32 in the direction as indicated by arrow 144 and transfer the heat-softened glass G from the furnace 12 into the shaping station 16.

Chains 90 and 92 and supported belt 32 sag between rolls 52 and 58 and assume a curved configuration as shown in FIG. 2. Belt 32 also sags in its transverse direction between the chains. The relative sag of chains 90 and 92 and corresponding curvature of the belt 32 between rolls 52 and 58 depends, in part, on the length of chain between the rolls and the spacing between the rolls. As can be appreciated to one skilled in the art, the sag of the chains 90 and 92 can be increased by increasing the length of chain between rolls 52 and 58 and/or reducing the spacing between rolls 52 and 58. Furthermore, it would be obvious that both the roll spacing and chain length between the rolls can be increased and still increase chain curvatures, provided that the increased curvature due to the increase in chain length overcomes the decreased curvature due to the increase in roll spacing. Similarly, both the chain length between the rolls and the roll spacing can be decreased and still increase the chain curvature.

Figure 7:
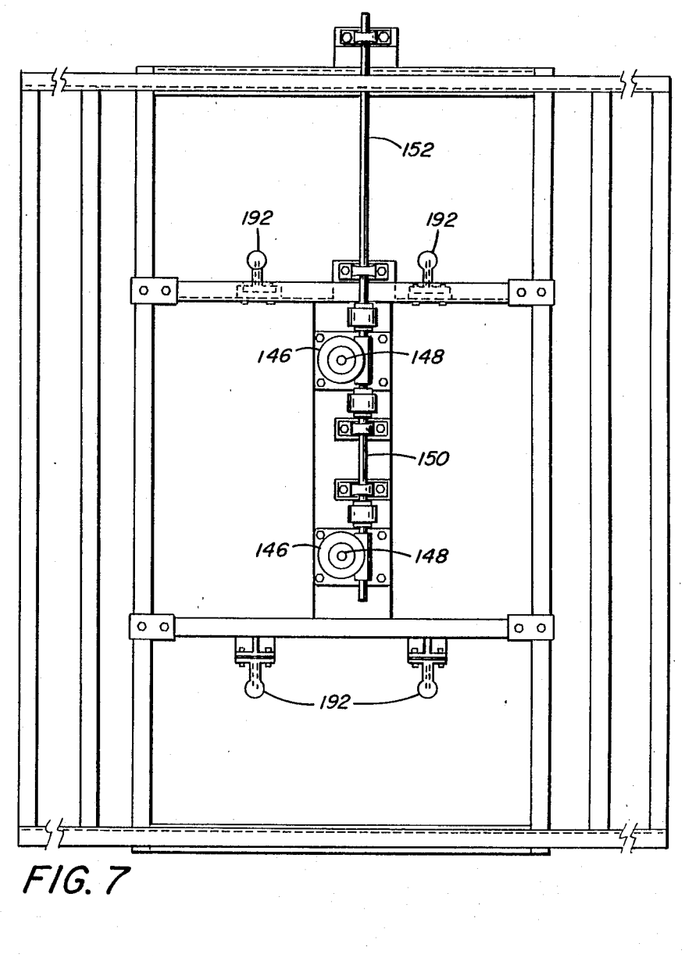
FIG. 7 is a detail of the connection between the conveyor belt and the drive chain.

From the previous description of the scissor table 34, it is apparent that the upward and downward movement of the cross beam 64 relative to the slotted beams 66 and 68 results in a "scissoring" action of the assemblies 36 and 38 which in combination with the restricted horizontal movement of pins 72, 78, 82, and 86 at the lower ends of assemblies 36 and 38 within slots 74, 80, 84, and 88, respectively, both raises and lowers the rolls 52 and 58 and moves them towards and away from each other as shown in FIG. 2. This movement of the rolls 52 and 58 which support the belt 32 via chains 90 and 92 changes the belt curvature as discussed earlier. Although not limiting in the present invention, in the preferred embodiment, a pair of screw jacks 146 are mounted on the table 34 with their extensible arms 148 secured to beam 64 as shown in FIGS. 2, 3, and 7. The screw jacks 146 are interconnected by a shaft 150 and are rotated through drive shaft 152 and sliding coupling 154 by drive 156. Drive 156 is mounted on platform 158.

Referring to FIG. 2, as screw jacks 146 moves beam 64 upward, drive roll 52 and trailing roll 58 move upward and toward each other and the radius of curvature of conveyor belt 32 decreases i.e., its curvature increases, as shown by the dotted lines 160. As the screw jacks 146 lower beam 64, this movement is reversed and the radius of curvature of the conveyor belt 32 is increased i.e., its curvature decreases. If required, the movement of rolls 110 and 112 on frames 114 and 116, respectively, may be coordinated with the scissoring action of assemblies 36 and 38 to further change the curvature of the belt 32. For example, as rolls 52 and 58 move upward and toward each other, frame 114 is rotated counterclockwise and frame 116 rotated clockwise, as shown by dotted lines 162 and 164, to reduce the distances between rolls 110 and 112, between rolls 52 and 110, and between rolls 58 and 112 so as to maintain as much chain length as possible between rolls 52 and 58. As assemblies 36 and 38 move downward, frames 114 and 116 move in the reverse direction.

Although not limiting in the present invention, to supplement the vertical movement of the belt 32 and glass sheet G as the scissor table 34 lifts the glass sheet G into engagement with upper mold 26, the particular embodiment of the invention shown in FIGS. 2 through 4 is provided with four screw jacks located at the corners of lower assembly 91 to vertically reciprocate the scissor table 34. Specifically referring to FIGS. 2, 3, and 6, screw jacks 166 and 168 are interconnected by shaft 170 and screw jack 172 and 174 are interconnected by shaft 176. Shaft 178 connects screw jack 168 with coupling 180 and shaft 182 connects screw jack 174 to coupling 180 via right angle coupling 184 and shaft 186. Referring to FIG. 3, drive 188 is interconnected to coupling 180 via shaft 190 such that rotation of shaft 190 by the drive 188 will simultaneously drive all four screw jacks to raise and lower the scissor table 34 and reduce the vertical movement of the belt 32 required for the mold 26 to engage the glass sheet G. Vertical guides 192 are positioned on the scissor table 34 and extend through collars 194 on lower assembly 196 to ensure that the scissor table 34 moves in a vertical direction. It is noted that the vertically reciprocating action provided by screw jacks 166, 168, 172 and 174 operates only to lift the scissor table 34 and in no way effects the scissoring action of assemblies 36 and 38.

In operation, a series of spaced glass sheets G are conveyed through the furnace 12 and heated to their heat-softening temperature. When the lead edge of the glass sheet G reaches a position which it is detected by the glass-sensing mechanism 22, a programmable controller (not shown) is activated to initiate the glass sheet shaping cycle. A complement of high-speed run-out conveyor rolls at the exit end of the conveyor 20 of the furnace 12, convey the heat-softened glass sheet G over rolls 24 and onto the moving conveyor belt 32. As the glass sheet G exits furnace 12, the belt 32 is positioned so that the leading edge of the glass sheet G is supported on the front portion 198 of belt 32 as belt 32 extends partially between rolls 52 and 58. The belt 32 is advanced toward roll 52 and the speed of the belt 32 is synchronized with the conveying speed of the glass sheet G so as to support the glass sheet G and make a smooth transfer from the furnace 12 to the belt 32 and into the shaping station 16. As the belt conveyor drive 142 continues to convey the glass sheet G below the upper mold 26, the glass sags to a preliminary shape on the conveyor belt 32. When the glass sheet G is properly positioned below the upper mold 26, drive 188 engages screw jacks 166, 168, 172 and 174 on the lower assembly 196 to move the scissor table 34 upward towards the upper mold 26 and specifically to move the glass sheet G adjacent the shaping surface 28 of the upper mold 26. After the scissor table 34 is elevated, drive 156 is engaged to raise beam 64 and initiate the scissoring action of scissor assemblies 36 and 38. Frames 114 and 116 pivot to release the chain tension. The upward movement of drive roll 52 and trailing roll 58 "wraps" the edges of the glass sheet G over the mold 26 and presses the glass sheet G thereagainst to conform the glass sheet G to the desired configuration. As an alternative, drive 188 may elevate table 34 a sufficient distance to initiate contact between the glass sheet G and mold 26. Afterward, drive 156 scissors assemblies 36 and 38 to wrap the edges of the glass sheet G over the mold 26 and complete the pressing operation.

After shaping, the scissor table 34 is retracted and the shaped glass sheet G is held against the upper mold 26 by a vacuum. Referring to FIG. 1, the sheet transfer means 18 in the form of a tempering ring 198 is positioned below the shaped glass sheet G to receive the sheet after vacuum is terminated in the upper mold 26. The tempering ring 198 then transfers the shaped glass sheet G into the cooling station 14 where it is cooled.

In the previously described embodiment of the invention, be drive 142, scissor drive 156, and table lifting drive 188 have been described as acting in sequence, that is, first, drive 142 drives belt 32 to position the glass sheet G under upper mold 26, then drive 188 raises the scissor table 34 and finally scissor drive 156 presses the glass sheet against the mold surface 28. However, it can be appreciated that two or all of the drives may be operating simultaneously. For example, after the glass sheet G is completely supported on the belt 32 and as drive 142 continues to position the glass sheet G below the mold 26, drive 188 may be engaged to elevate the scissor table 34 while at the same time scissor drive 156 may be engaged to initiate the scissoring action of the scissor assemblies 36 and 38. It should be appreciated that if the vertical movement of the belt 32 and glass sheet G on the scissor table 34 is sufficient to press the glass sheet G against upper mold 26, the lifting arrangement provided by the reciprocating drive 188 may be eliminated. However, in the preferred embodiment of the invention, drive 188 is included to reduce the cycle time of the shaping operation.

During the pressing operation, since trailing roll 58 is free wheeling, that is, it is not directly driven by belt drive 142 and is free to rotate as the belt 32 is driven, all the tension in the chains 90 and 92 and belt 32 during pressing is relieved from the trailing end. As an alternative, a clutch (not shown) may be added, for example at the drive 142, to release the tension in drive chain 132 during the pressing operation so as to allow the drive roll 52 to rotate during pressing and thus equalize the tension in the chains 90 and 92 and belt 32 from both ends.

In the preferred embodiment of the invention, belt 32 runs in one direction, i.e., clockwise, as shown in FIG. 2. This arrangement allows the belt to be self-cleaning, i.e., any debris on the belt face will be removed when the belt is inverted and returned to its initial position prior to the conveying and pressing cycle. It is preferred that the belt 32 not be continuous but rather be only about half as long as the entire belt travel since a continuous belt would be more difficult to change and care would have to be taken so as not to press the heat-softening glass sheets on a seam of a continuous belt. In addition, cooling of the continuous belt would be more difficult because of the additional belt material.

As discussed earlier, the scissoring action of the scissor table 34 decreases the radius of curvature of the supported glass sheet as the sheet is wrapped around the shaping mold 26. Referring to FIG. 8, auxiliary rolls 200 and 202 mounted on scissor arms 40, 42, 44, and 46 (not shown in FIG. 8) may be used to further decrease the radius of curvature of the belt-supported, heat-softened glass sheet G while reducing the amount of scissoring action by the scissor table 34 required to get such a curvature. Line 204 shows the normal shape of the belt 32 as it extends from drive roll 52 to trailing roll 58 while dotted line 206 illustrates the belt line as the belt 32 extends between auxiliary rolls 200 and 202. As can be seen, the shape of line 206 is equivalent to what the curvature represented by line 204 would be if rolls 52 and 58 were moved to the positions shown by 52' and 58' as indicated by phantom lines 208. In this manner, sharpness of the glass wrap during the final pressing against mold 26 is effectively increased while reducing the amount of scissoring action required by the scissor table 34 and the associated elevation of rolls 52 and 58. Rolls 200 and 202 may be adjustable so as to change the contour line 206 of the belt 32, as required. It is obvious from this teaching that the curvature of belt 32 is further increased when scissor assemblies 36 and 38 operate to move rolls 52 and 58 upward.

In the present invention, the glass sheet is transferred from the furnace 12 to the shaping station 16 by the conveyor belt 32. However, it would be obvious to one skilled in the art that other transfer mechanisms may be used. For example, a vacuum pickup as taught in U.S. Pat. No. 4,662,925 to Thimons et al or a vacuum/pressure pickup as taught in U.S. Pat. No. 4,767,437 to Lampman et al may be used to effectively transfer the heat-softened glass sheet G to the shaping station 16.

Although the movement of assemblies 36 and 38 and frames 114 and 116 is coordinated to move rolls 52 and 58 along an arc and change the belt 32 curvature as desired during passing, it should be appreciated that frames 114 and 116 may be used by themselves to wrap the glass sheet G against mold 26. Specifically, reciprocating drive 188 may move the scissor table 34 upward and/or mold 26 may move downward to press the glass sheet G against the mold 26. As mold 26 continues to press into the belt 32, frames 114 and 116 rotate counter-clockwise and clockwise, respectively as shown in FIG. 2, to release the tension in chains 90 and 92 and increase the length of chains 90 and 92 between rolls 52 and 58, so as to increase the sag and associated curvature of the belt 32 and supported glass sheet G. Vacuum is applied through the mold 26 during pressing which holds the glass sheet G against surface 28 after the mold 26 and belt 32 separate.

In an alternate embodiment of the invention, if it were required that rolls 52 and 58 remain at a constant elevation, each could be provided with a pin and horizontal slot arrangement (not shown) similar to that discussed for the lower end of assemblies 36 and 38. It is obvious that if rolls 52 and 58 are restricted to move horizontally, provisions must be made to allow the lower ends of assemblies 36 and 38 to move in both a horizontal and vertical direction during the scissoring operation.

The present invention provides a novel means to shape heat-softened glass sheets in a manner that eliminates the potential for marking from a rigid lower press face. If used as one of the glass plies for a windshield, the shaped glass sheets are stronger than pairs of glass sheets, i.e., doublets, made by a conventional gravity sag bending arrangement. While the glass is sandwiched between the mold 26 and belt 32, the glass temperature is reduced from the softening point temperature through its annealing range so that the glass sheet is heat strengthened. In a conventional glass doublet sag bending operation, the cooling rate of the gravity bent doublets is limited since cooling air cannot be circulated between the pair of glass sheets so that the glass is not heat strengthened. In addition, a bending iron shaping rail which supports the peripheral edges of the glass doublets during a gravity sag bending operation may induce additional stresses in the glass during cooling, at or near the points at which the rail contacts the glass surface. The present invention eliminates these induced stresses.

The form of the invention shown and described in this disclosure represents an illustrative preferred embodiment thereof. It is understood that various changes may be made without departing from the spirit of the invention except insofar as to find in the claimed subject matter that follows.

I claim:

1. A method of shaping heat softenable sheet material comprising:
   heating said sheet material;
   transferring said sheet onto an advancing flexible support such that there is no relative movement between said sheet and said portions of said advancing support supporting said sheet;
   continuing to advance said support to position said sheet relative to a horizontally stationary upper shaping surface;
   stopping said advancing of said flexible support; and
   moving said flexible support and said shaping surface toward each other to urge said sheet against said shaping surface to shape said sheet between said flexible support and said shaping surface.

2. The method as in claim 1 wherein said heating step includes conveying said sheet through a heating means and said transfering step includes depositing said sheet on an advancing belt as said sheet exits said heating means.

3. The method as in claim 2 further including the step of deforming said flexible support during at least a portion of said moving step to generally conform said sheet and support to said shaping surface.

4. The method as in claim 3 wherein said deforming step includes increasing the curvature of said belt and supported sheet.

5. The method as in claim 4 further including the step of supporting opposing ends of said flexible support and wherein said deforming step includes moving said opposing ends of said support towards each other to increase the curvature of said flexible support.

6. The method as in claim 5 wherein said continuing step includes advancing said belt and said sheet to a position generally vertically aligned with said shaping surface.

7. The method as in claim 6 further including the step of drawing a vacuum along said shaping surface, removing said support and holding said sheet against said shaping surface by vacuum.

8. The method as in claim 7 further including the step of cooling said sheet.

9. An apparatus for shaping heat softenable sheet material comprising:
- a horizontally stationary shaping surface;
- a compliant support member;
- means to advance said support member from a first position wherein first support member supports a portion of said sheet to a second position wherein said support member supports said entire sheet;
- means to transfer said sheet onto said advancing support member such that there is no relative movement between said sheet and said advancing support member;
- means to stop said advancing support member to position said sheet relative to said shaping surface; and
- means to move said compliant support member and said shaping surface toward to each other to urge said support member against said shaping surface and generally conform said support member to said shaping surface.

10. The apparatus as in claim 9 further including means to change the configuration of said support member.

11. The apparatus as in claim 10 wherein said support member is a conveyor belt and further including means to simultaneously move said belt relative to said shaping surface and change said configuration of said belt.

12. The apparatus as in claim 10 wherein said support member includes a conveyor belt and said shaping surface is an upper press face vertically aligned with at least a portion of said belt and further including means to support said belt at an upstream and a downstream portion wherein said belt sags and assumes an initial configuration.

13. The apparatus as in claim 12 further including chain members extending between said upstream and downstream support means and means to adjust the length of said chain members between said support means to vary the sag and corresponding configuration of said belt.

14. The apparatus as in claim 12 wherein said curvature changing means includes means to move said upstream and downstream portions of said belt towards and away from each other to change said sag and corresponding curved configuration of said belt.

15. The apparatus as in claim 14 wherein said curvature changing means further includes a scissor table with first and second scissor arrangements positioned along opposing sides of said table and further wherein each of said scissor arrangements includes a first arm with a first end supporting said upstream portion of said belt, pinned to moving means includes means to pivot each of said first and second arms of each of said scissor assemblies relative to each other from a first position wherein said belt assumes said initial sag configuration, to a second position wherein said belt assumes a different curved configuration.

16. The apparatus as in claim 15 wherein said curvature changing means includes means to adjust said sag of said belt while said arms are in said first position.

17. The apparatus as in claim 15 further including a first conveyor roll between said first arms of said scissor arrangements and a second roll between said second arm of said scissor arrangements, support chains extending between said first and second rolls and a means to secure said belt to said chains.

18. The apparatus as in claim 17 wherein said moving means includes drive means operatively connected to at least one of said rolls to rotate said roll and advance said chains and said belt.

19. The apparatus as in claim 18 further including means to support said belt from said chain along the belt's longitudinal edges.

20. An apparatus for shaping softenable sheet material comprising:
- a shaping surface;
- a compliant support member;
- a scissored table with first and second scissor arrangements positioned along opposing sides of said table wherein each of said scissor arrangements include a first arm with a first end supporting an upstream portion of said support member, pinned to a second arm supporting a downstream portion of said support members;
- means to pivot each of said first and second arms of said scissor assemblies relative to each other from a first position wherein said support member assumes an initial configuration to a second position wherein said support member assumes a different configuration; and
- means to move said support member and said shaping surface relative to each other to urge said support member against said shaping surface and generally conform said support member to said shaping surface.

21. A conformable lower press surface for a sheet press bending arrangement comprising:
- a conveyor belt;
- means to support said belt at a first end portion and an opposing end portion wherein said belt assumes an initial configuration;
- a scissored table having first and second scissor arrangements positioned along opposing sides of said table wherein each of said scissor arrangements include a first arm with a first end supporting said first end portion of said belt, pinned to a second arm supporting an opposing end portion of said belt; and
- means to pivot each of said first and second arms of each of said scissor assemblies relative to each other from a first position wherein said belt assumes said initial configuration to a second position wherein said belt assumes a different configuration.

22. The apparatus as in claim 21 further including a first roll between said first arms of said scissor arrangements and a second roll between said second arms of said scissor arrangements, support chains extending between said rolls, means to secure said belt to said chains, and drive means operatively connected to at least one of said rolls to rotate said roll and advance said chain and supported belt.

* * * * *